US006640265B1

(12) United States Patent
Kim

(10) Patent No.: US 6,640,265 B1
(45) Date of Patent: Oct. 28, 2003

(54) METHOD AND SYSTEM FOR IMPLEMENTING FUNCTION MODULES IN AN IMAGE FORMING APPARATUS

(75) Inventor: Yong-geun Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 490 days.

(21) Appl. No.: 09/635,558

(22) Filed: Aug. 10, 2000

(30) Foreign Application Priority Data

Nov. 20, 1999 (KR) ...................................... P1999-51742

(51) Int. Cl.[7] ................................................ G06F 3/00

(52) U.S. Cl. .............................. 710/30; 710/8; 710/14; 712/225; 358/400

(58) Field of Search .............................. 358/400; 710/8, 710/9, 11, 36, 43, 54, 5, 10, 12, 14, 15, 18, 30, 52, 67; 399/110; 712/225

(56) References Cited

U.S. PATENT DOCUMENTS 5,249,183 A 9/1993 Wong et al.
5,436,903 A 7/1995 Yang et al.
5,469,437 A 11/1995 Runaldue
5,541,957 A 7/1996 Lau
5,579,088 A * 11/1996 Ko ............................ 355/203
5,640,467 A * 6/1997 Yamashita et al. .......... 382/181
5,646,939 A 7/1997 Lindeborg et al.
5,717,889 A 2/1998 Rettig
5,802,017 A 9/1998 Sato et al.
5,809,145 A * 9/1998 Slik et al. ..................... 380/25
5,848,274 A * 12/1998 Hamby et al. ............. 395/705
5,935,267 A 8/1999 Hayakawa
5,974,284 A * 10/1999 Sato et al. .................... 399/76
6,072,595 A * 6/2000 Yoshiura et al. ............ 358/400
6,308,026 B1 * 10/2001 Kouchi ....................... 399/110

OTHER PUBLICATIONS

DVCams: Firewire & IEEE 1394 international standards, (http://www.eng.dmu.ac.uk/~mt96/pjb/pp/firewire.htm) total 3 pages.

* cited by examiner

*Primary Examiner*—Kim Huynh
*Assistant Examiner*—RiJue Mai
(74) *Attorney, Agent, or Firm*—Robert E. Bushnell, Esq.

(57) ABSTRACT

A process is described for implementing a plurality of function modules stored in an image forming apparatus. The process installs a hardware module without need to install a software module. An input of a predetermined key code corresponding to the specific function completes the installation of the specific function when the image forming apparatus additionally requires the specific function.

36 Claims, 6 Drawing Sheets

METHOD AND SYSTEM FOR IMPLEMENTING FUNCTION MODULES IN AN IMAGE FORMING APPARATUS

CLAIM OF PRIORITY

This application makes reference to, incorporates the same herein, and claims all benefits accruing under 35 U.S.C. §119 from the inventor's application A METHOD FOR IMPLEMENTING FUNCTION MODULES IN AN IMAGE FORMING APPARATUS filed with the Korean Industrial Property Office on Nov. 20, 1999 and there duly assigned Ser. No. 51742/1999.

BACKGROUND OF THE INVENTION

1. Field of the Invention

The present invention relates to a process and system for implementing function modules in an image forming apparatus. More particularly, the invention concerns a process and system for implementing function modules in an image forming apparatus when the image forming apparatus requires an additional function.

2. Description of the Related Art

Generally, an image forming apparatus calculates image data by operation on a data input from an external device. The apparatus forms an image picture on a display device according to the image data. A user requires not only an image forming function but also, as the circumstance requires, various communication functions such as Ethernet, Token Ring, and IEEE 1394 bus. The conventional process for adding to the image forming apparatus such functions as Ethernet, Token Ring, and IEEE 1394 bus is that the user must install both hardware and software modules for implementing the functions or must install at least a software module without a hardware module for implementing the functions. See FIG. 1.

The following patents are considered to be representative of the prior art relative to the present invention, and they are illustrative of the disadvantages discussed above:

U.S. Pat. No. 5,640,939 entitled METHOD AND APPARATUS FOR ADDRESS TO PORT MAPPING IN A TOKEN RING NETWORK to Lindeborg et al. discloses a concentrator 10 containing a plurality of media modules 14 having ports 2 connected to a plurality of stations such as computers over lines or lobes 4. Each module 14 contains a module processor for performing the addresses to port mapping.

U.S. Pat. No. 5,249,183 entitled INTERFACING UNIT FOR LOCAL AREA NETWORKS to Won et al. discloses a local area network(LAN) 20 with a 10 Base-T media attachment unit (MAU) 22 for interfacing to an unshielded twisted pair link 24 and an ethernet (Coaxial) type MAU 21 for interfacing to a coaxial link 23.

An article in www.eng.dmu.ac.uk/~mt96/pjb/pp/firewire.htm discloses a direct digital connection system enabling a DV camcorder to be connected to any device, equipment or system, such as a personal computer, conforming to the interface technology of the IEEE 1394 bus. The direct digital connection system shows various types of connections between consumer devices and between consumer devices and PC.

U.S. Pat. No. 5,802,017 entitled INFORMATION-SIGNAL RECORDING APPARATUS AND RECORDING MODE INQUIRING/SPECIFYING METHOD to Sato et al. discloses a IEEE 1394 serial bus and a transmission and reception blocks to and from an IEEE 1394 bus. IEEE 1394 serial buses are used to connect Hard disk driver, a television receiver, a video tape recorder, a CD player, and a PC to each other.

U.S. Pat. No. 5,935,267 TO Hayakawa, entitled DATA COMMUNICATION METHOD AND A DATA COMMUNICATION SYSTEM FOR USER WITH A DIGITAL NETWORK, shows a communication network having data transmission and reception nodes implemented by IEEE 1394 standard.

U.S. Pat. No. 5,717,889 to Rettig, entitled COLLISION REDUCTION ALGORITHM FOR AN ETHERNET BACKOFF PROTOCOL, U.S. Pat. No. 5,541,957 to Lau, entitled APPARATUS FOR TRANSMITTING AND/OR RECEIVING DATA AT DIFFERENT DATA TRANSFER RATES ESPECIALLY IN APPLICATIONS SUCH AS DUAL-RATE ETHERNET LOCAL-AREA NETWORKS, U.S. Pat. No. 5,436,903 to Yang et al., entitled METHOD AND APPARATUS FOR USE IN A NETWORK OF THE ETHERNET TYPE, TO IMPROVE FAIRNESS BY CONTROLLING COLLISION BACKOFF TIMES AND USING STOPPED BACKOFF TIMING IN THE EVENT OF CHANNEL CAPTURE, and U.S. Pat. No. 5,469,437 to Runaldue, entitled NETWORK CHIP WITH AUTO SENSING AND RECONFIGURATION show a various of ethernet local area networks.

The user buys a hardware module for implementing a required function and a software module (or program) for driving the hardware module or a specific software module. First, the user decides whether to install the hardware module in the image forming apparatus. If the user decides to make the hardware installation, the user installs the hardware module in the image forming apparatus. The user decides whether to install the software module in the image forming apparatus or not. If the user decides not to install the hardware module, there is no need to decide whether to install the software module. If the user decides to install the software module in the image forming apparatus, the user installs the software module in the image forming apparatus, restarts the image forming apparatus, and then confirms that the normal operation of the installed function is provided by the hardware and software modules. Thus, the function adding operation is completed.

This process is not entirely satisfactory however. Although it is relatively easy to install a hardware module in an image forming apparatus pursuant to an installation manual, it is hard to install a software module in the image forming apparatus, since the functions of software modules are increasingly more complex than before. Accordingly, an ordinary user cannot quickly and reliably install a software module in an image forming apparatus module. Even an expert has considerable trial and error and spends a lot of time in the software installation. Thus, it costs the provider much expense for after-sales service. Moreover, when both of the hardware and software are provided for adding a function in the image forming apparatus, the cost of the software and the charges for transporting and storing are increased compared to when only the hardware is provided. Furthermore, while there hardly can be unauthorized copies when both of the hardware and software are provided for adding a function in the image forming apparatus, there may be plenty of unauthorized copies when only software is provided for adding functions in the image forming apparatus. Thus, profits obtained from selling the special function software are reduced. I have noticed, therefore, a need for a new process and apparatus for adding functions to an image forming apparatus. This is required to provide to users the advantage of conveniently and quickly adding the required function to the image forming apparatus, while also providing an advantage to the provider by reducing the cost of offering after-sales services to the users and by preventing pirated editions of the hardware and software.

SUMMARY OF THE INVENTION

It is, therefore, an object of the present invention to provide an improved image formation process and apparatus.

It is another object to provide image formation processes and apparatus that are susceptible to implementation as hardware modules.

It is still another object to provide a process for implementing function modules in an image forming apparatus when the image forming apparatus requires an additional communication-related function. In this regard, it is an object to provide a process for installing a hardware module without having to install a software module. It is also desired to make the apparatus capable of completing the installation of the additional function by input of a predetermined key code corresponding to the additional function.

It is still yet another object to provide a process and apparatus for adding functions to the image forming apparatus, thereby providing to users the advantage of conveniently and quickly adding the required function to the image forming apparatus. It is also an object to reduce the cost of offering after-sales services to the users and to prevent recourse to pirated editions of the hardware and software.

These and other objects may be attained with the implementation of additional communication function modules in an image forming apparatus according to the present invention. When hardware is needed for operating necessary function modules, the invention operates by: installing a hardware module in an image forming apparatus; selectively operating a control panel or a management program of the image forming apparatus; and providing an input of a function key code. The code is generated by: combining a first data series for identifying respective image forming apparatuses with a second data series corresponding to function module numbers; storing the function key code in a memory section; and starting the function module by starting the image forming apparatus after selectively operating the control panel or the management program of the image forming apparatus and providing an input of the function key code.

These objects may also be accomplished with the implementation of function modules in an image forming apparatus according to the present invention when there is no need for additional hardware for operating the function module. This is accomplished by: selectively operating a control panel or a management program of the image forming apparatus; providing an input of a function key code generated by combining a first data series for identifying respective image forming apparatuses with a second data series corresponding to function module numbers; storing the function key code in memory means; and starting the function module by starting the image forming apparatus after selectively operating the control panel or the management program of the image forming apparatus, and inputting the function key code.

It is preferable that the function key code be generated through an encoding algorithm for encoding the combination of the first data series and the second data series. The step for starting the function module contemplates: recognizing the function key code; recognizing the first data series; extracting the function module number from the combination of the function key code and the first data series through a decoding algorithm; and starting the function module corresponding to the extracted function module number.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
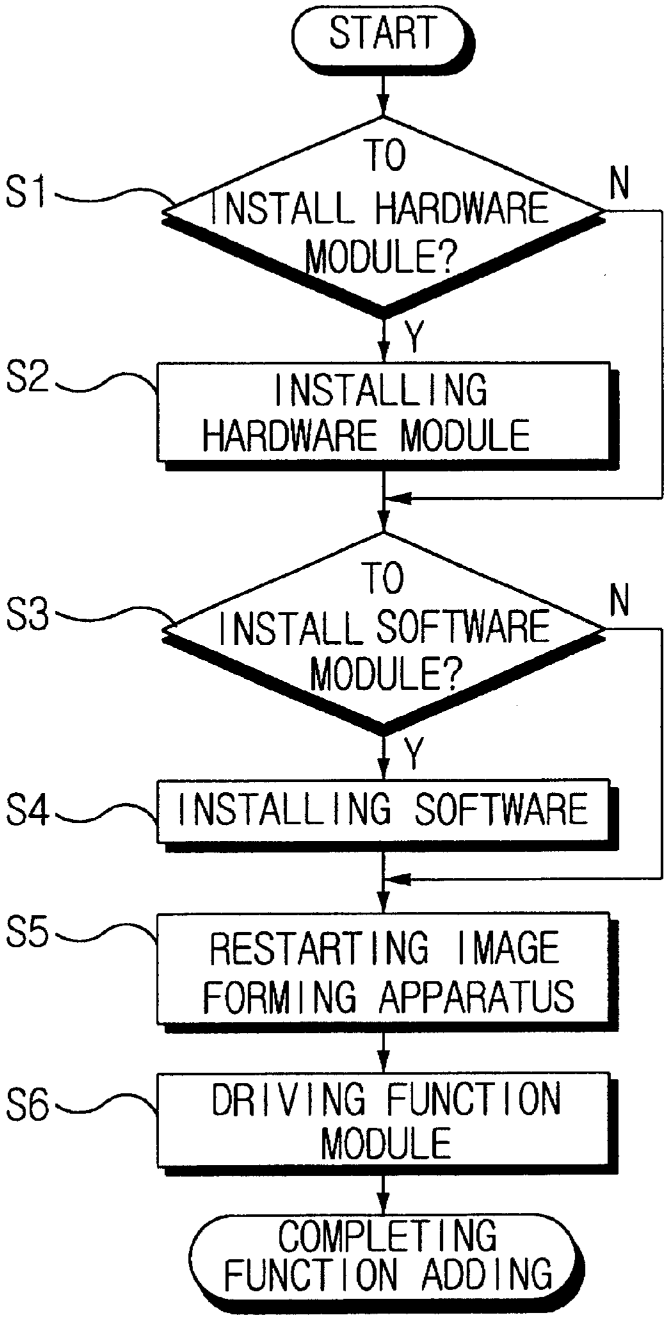
FIG. 1 (PRIOR ART)
FIG. 1 is a flowchart of a conventional process for adding functions to an image forming apparatus.

FIG. 1 is a flowchart showing a conventional process for adding functions to an image forming apparatus.

The user buys a hardware module for implementing a required function and a software module (or program) for driving the hardware module or a specific software module. First, the user decides whether to install the hardware module on the image forming apparatus or not (Step S1). Second, if the user decides to make the hardware installation, the user installs the hardware module on the image forming apparatus (Step S2). Third, the user decides whether to install the software module in the image forming apparatus or not (Step S3). In step , S1, if the user decides not to install the hardware module, step S3 for deciding whether to install the software module or not is executed.

In step S3, if the user decides to install the software module in the image forming apparatus, the user installs the software module in the image forming apparatus (Step S4). After step S4, the image forming apparatus is re-started (Step S5). After that, the user confirms the normal operation of the installed function (hardware and software modules) (Step S6). Thus, the function adding operation is completed.

Figure 2:
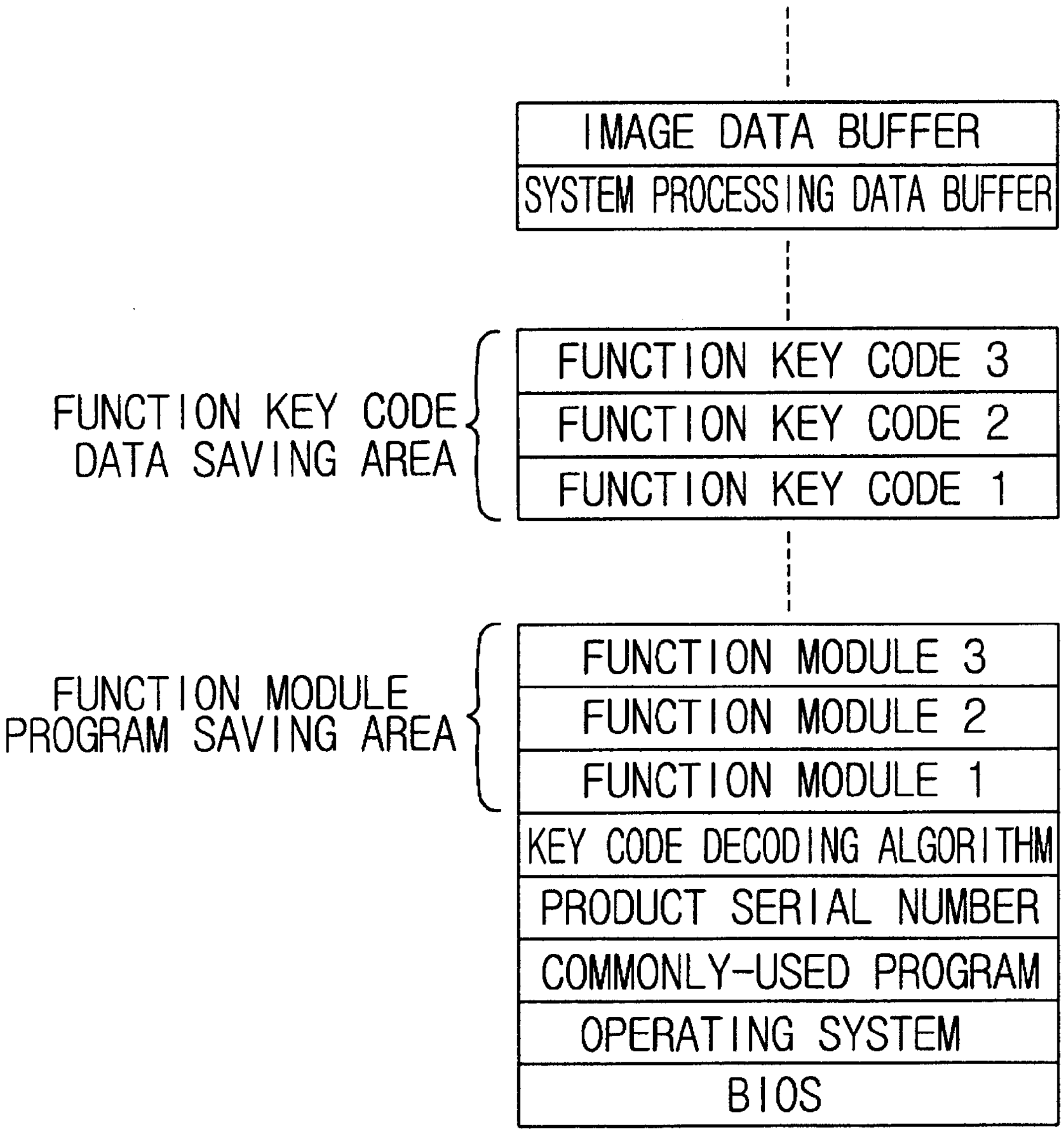
FIG. 2 shows a memory application structure of an image forming apparatus according to the principles of the present invention.
Figure 3A:
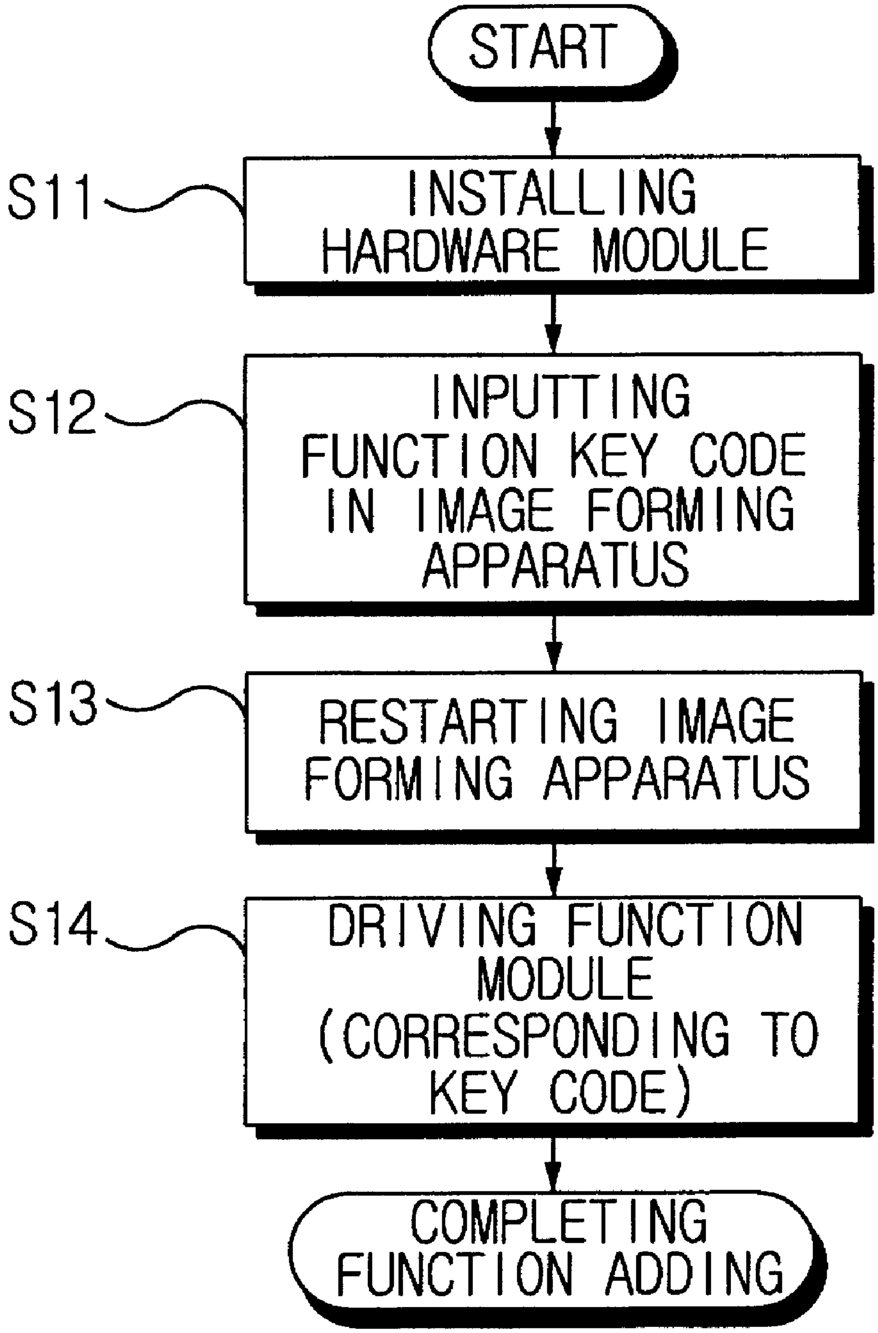
FIGS. 3A and 3B are flowcharts showing examples of the function adding processes of the image forming apparatus according to the present invention.
Figure 3B:
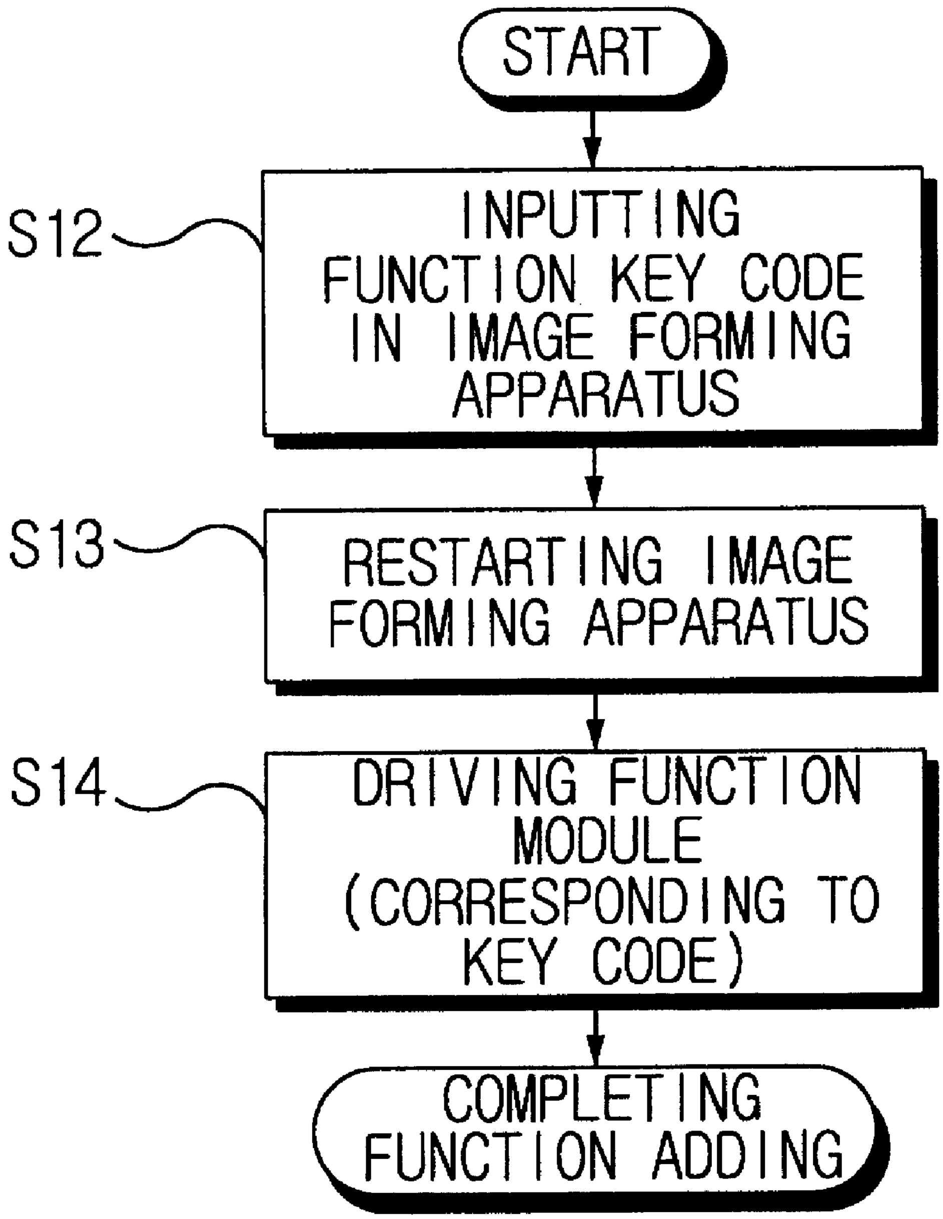

Referring to FIG. 2, the process for implementing function modules in an image forming apparatus according to the instant invention is described in detail. First, the memory application structure of the image forming apparatus according to the present invention is described with reference to FIG. 2. Next, with reference to FIGS. 3A and 3B, the function adding process is described which is used when the function module has to be added in the image forming apparatus of FIG. 2. Next, with reference to FIG. 4, the operational order of the starting of the function module of FIGS. 3A and 3B is described in detail. Finally, with respect to the function module to be added, the relation between the function key code and the function module program through the operating algorithm will be described with reference to FIG. 5.

Memory Application Structure of the Image Forming Apparatus According to the Present Invention When shipping or selling an image forming apparatus, the producer or provider of an image forming apparatus (hereinafter the "provider") provides identification numbers to identify each of the function modules, and stores the programmed identification numbers in a hard disk or a memory device of the image forming apparatus. Data for identifying the provider, i.e., serial number, brand name, or model name of the product, are also stored. Further, with the identification numbers of the function modules and the serial number (or brand name or model name) of the image forming apparatus, the provider generates the function key codes corresponding to the identification number of each function module through an encoding algorithm, and stores the function key codes together with a decoding algorithm for decoding the function key codes.

FIG. 2 shows the memory application structure of an image forming apparatus according to the provider's setting.

When a user of the image forming apparatus having the function modules established therein requests the provider to add a specific function, the provider provides the user with the hardware module for implementing the required specific function. At this time, the provider also provides the user with the function key code corresponding to the function module for driving the hardware module. Meanwhile, if the specific function can be implemented by the function module stored in a memory device without requiring further installation of a separate hardware module, the provider simply provides the user with a function key code for driving the required function module.

Conventionally, when the user requires an additional function, the provider usually provided the user with the software module as well as the hardware module because the driving program (software) for the required function was not stored in the conventional image forming apparatus. According to the present invention, however, since the driving programs for the various required functions are stored in advance in the image forming apparatus, the user simply needs the required hardware module and the function key code, and does not have to separately install a special program.

Process for Implementing a Function Module When the Image Forming Apparatus Requires Additional Functions The process for adding modules to an image forming apparatus according to the present invention is now described in greater detail with reference to the accompanying drawings. Example 1 concerns a function module adding process when the hardware needs to be added for operating the function module, and Example 2 concerns a function module adding process when there is no need to add the hardware for operating the function module.

EXAMPLE 1

FIG. 3A is a flowchart illustrating the function module adding process for an the image forming apparatus when hardware must be added for operating the function module according to Example 1.

Inside the image forming apparatus, programs (software) for achieving certain communication-related functions are built into the hard disk or the memory.

This example shows the process for adding the function module when the hardware needs to be added for operating the function module by the user's request for adding a certain function module to the image forming apparatus.

The provider provides the user with hardware modules for performing certain functions. Together with this, the provider also provides function key codes corresponding to the function modules for operating the hardware modules. The function key codes may be created by an encryption algorithm with the identification numbers of the function modules and the product serial number of the user's image forming apparatus.

In order to add a certain function, the user firstly installs the hardware module provided by the provider in the image forming apparatus (step S11).

Then the user stores the function key codes provided by the provider into the nonvolatile memory device by inputting the function key codes into the image forming apparatus through the control panel, or through the control program of the image forming apparatus (step S12). The function key codes stored in the nonvolatile memory should be referred as references when the image forming apparatus is restarted after being powered off.

After inputting the function key codes, the user restarts the image forming apparatus (step S13).

As the image forming apparatus is restarted, the function module corresponding to the stored function key codes are operated in step S14. Then as the user confirms the re-operation of the function modules, the function module adding process is completed.

EXAMPLE 2

FIG. 3B is a flow chart illustrating a process for adding the function modules of an image forming apparatus when there is no need to add the hardware for operating the function modules according to Example 2.

Hereinafter described is the process for adding a user's requested function when there is no need to add the hardware for operating the function modules corresponding to a certain function.

When the user adds a function to the image forming apparatus, and when it is determined that the requested function can be performed by the function modules which were already installed in the image forming apparatus without requiring any hardware, the provider only provides the user with a function key code for operating the function module. The function key code may be created by an encryption algorithm with the identification numbers of the function modules and the product serial number of the user's image forming apparatus.

In order to add a particular function, the user stores the function key code provided by the provider into the memory device by inputting the function key codes into the image forming apparatus through the control panel, or through a control program of the image forming apparatus (step S12).

After inputting the function key codes, the user restarts the image forming apparatus (step S13).

As the image forming apparatus is restarted, the function modules corresponding to the stored function key codes are operated (step S14). Then, as the user confirms the re-operation of the function modules, the function adding process is completed.

Details of the Function Module Operation

Figure 4:
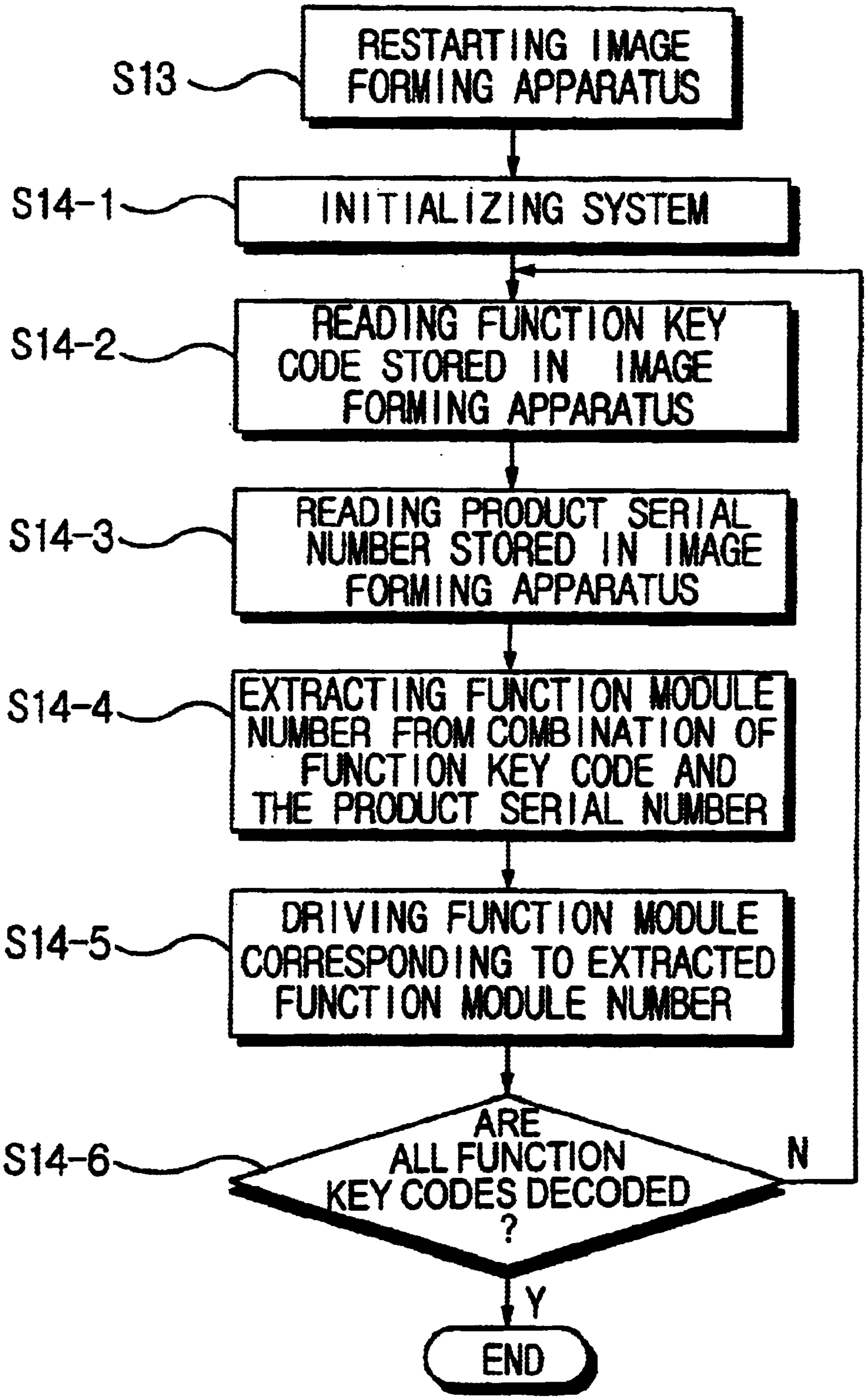
FIG. 4 is a flowchart showing the operational order for starting the function module among the function adding process of the image forming apparatus of FIGS. 3A and 3B.

Next, step S14 for operating the function modules of FIGS. 3A and 3B is described in greater detail. FIG. 4 is a flow chart showing a process for starting the function module according to the function adding process of the image forming apparatus of FIGS. 3A and 3B.

First, after inputting the corresponding function key code, the image forming apparatus is restarted (Step S13), and the image forming apparatus is initialized (Step S14-1). Then a central processing unit of the image forming apparatus reads the function key code stored in step S3 as shown in FIG. 3 (Step S14-2), and then also reads the serial number (or, the brand name or the model name) stored in the memory device of the image forming apparatus (Step S14-3).

Next, to extract a function module number, the function key code and the serial number read from the memory are combined with each other and operated through the decoding algorithm of the function key code stored in the memory (Step S14-4). Then the correct function module program corresponding to the extracted function module number is started (Step S14-5).

Then, it is determined whether all of the function key codes inputted by the user have been decoded or not (Step S14-6). When all of the function key codes are determined to be decoded, the adding operation of the function module is completed. Meanwhile, if some function key codes remain in an un-decoded state, the decoding procedure is executed again from step S14-2 until all of the function key codes are decoded, and then the specific function module is started.

Hereinafter, the process for extracting the function module number in step S14-4 is described in detail.

Figure 5:
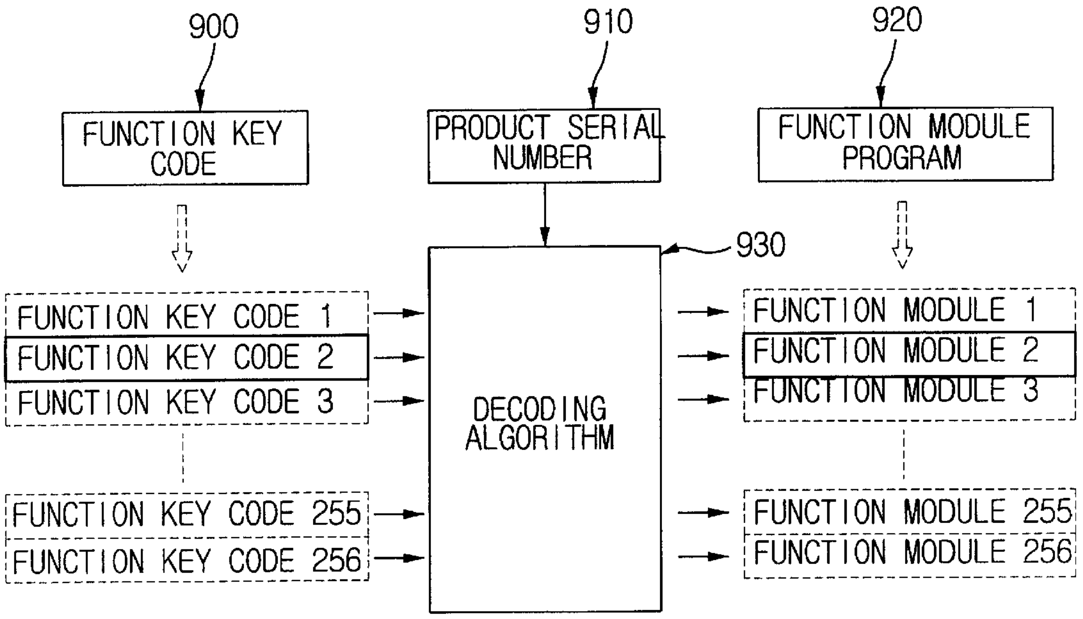
FIG. 5 shows the relation between the function key code and the function module program through the operating algorithm.

FIG. 5 shows the way of linking the function key code with the function module program through an operating algorithm.

In FIG. 5, the function key code series (900), serial number (910), function module program (920), and operating (decoding) algorithm (930) are stored in the memory device of the image forming apparatus as shown in FIG. 2. When the user inputs a specific function key code into the image forming apparatus, the central processing unit reads the serial number (910) and the function key code (900) corresponding to the inputted function key code and executes the operating (decoding) algorithm (930).

The operating (decoding) algorithm (930) decodes the function key coded through the coding algorithm by the combination of the function module number and the serial number, and then the information about the specific function module number included in the function key code is extracted.

The central processing unit calls the function module corresponding to the extracted function module number from the memory device and executes the function module. According to the operation of the central unit, the required function is accomplished by starting and driving the hardware module.

For example, when the user inputs function key code 2, the central processing unit calls function key code 2 and the serial number stored in the memory device, and combines the same. The central processing unit extracts function module 2 through the operating algorithm and starts function module 2. If the other function key codes, excluding function key code 2, are combined with the serial number (910) through the operating algorithm (930), since function module 2 is not extracted, the function module program cannot be started.

The other function modules will be started according to the process as described above when the function key code corresponding to the required function module is inputted.

In the process for implementing the function module of the image forming apparatus according to the present invention, since the user can implement the required function by installing the hardware module and by inputting the function key code corresponding to the function, the user can conveniently install the function module. Accordingly, the cost of the software materials and the charges for transporting and storing are decreased compared to the conventional case, and the distribution of pirate editions of the function module program are also prevented.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A process for implementing a plurality of function modules stored in an image forming apparatus, said process comprising the steps of:

(1) installing a hardware module in an image forming apparatus;

(2) selectively operating one of a control panel and a management program of the image forming apparatus;

(3) providing an input of a function key code, said code being generated by combining a first data series for identifying respective image forming apparatuses with a second data series corresponding to function module numbers;

(4) storing the function key code in a memory; and (5) starting the function module by restarting the image forming apparatus.

2. The process of claim 1, wherein the function key code is generated by a coding algorithm for coding a combination of the first data series and the second data series.

3. The process of claim 1, wherein the step of starting the function module comprises sub-steps of:

(a) recognizing the function key code;

(b) recognizing the first data series;

(c) extracting the function module number from a combination of the function key code and the first data series; and (d) starting the function module corresponding to the extracted function module number.

4. The process of claim 3, wherein the function module number is extracted through use of a decoding algorithm.

5. The process of claim 1, wherein the first data series is a serial number of the image forming apparatus.

6. The process of claim 1, wherein the first data series is a brand name of the image forming apparatus.

7. The process of claim 1, wherein the first data series is a model name of the image forming apparatus.

8. The process of claim 1, wherein, the second data series comprises a plurality of data, each of which has a different value.

9. The process of claim 1, wherein the second data series is newly inputted and stored in the image forming apparatus during an assembling process.

10. The process of claim 1, wherein the second data series is newly inputted and stored in the image forming apparatus which is completely assembled.

11. The process of claim 1, wherein the second data series is changed and stored in the image forming apparatus during an assembling process.

12. The process of claim 1, wherein the second data series is changed and stored in the image forming apparatus which is completely assembled.

13. A process for implementing a plurality of function modules stored in an image forming apparatus, said process comprising the steps of:

(1) selectively operating one of a control panel and a management program of the image forming apparatus;

(2) providing an input of a function key code, said code, being generated by combining a first data series for identifying respective image forming apparatuses with a second data series corresponding to function module numbers;

(3) storing the function key code in a memory; and (4) starting the function module by restarting the image forming apparatus after carrying out the preceding steps.

14. The process of claim 13, wherein the function key code is generated by a coding algorithm for coding a combination of the first data series and the second data series.

15. The process of claim 13, wherein the first data series is a serial number of the image forming apparatus.

16. The process of claim 13, wherein the first data series is a brand name of the image forming apparatus.

17. The process of claim 13, wherein the first data series is a model name of the image forming apparatus.

18. The process of claim 13, wherein, the second data series comprises a plurality of data, each of which has a different value.

19. The process of claim 13, wherein the second data series is newly inputted and stored in the image forming apparatus during an assembling process.

20. The process of claim 13, wherein the second data series is newly inputted and stored in the image forming apparatus which is completely assembled.

21. The process of claim 13, wherein the step of starting the function module comprises sub-steps of:

(1) recognizing the function key code;

(2) recognizing the first data series;

(3) extracting the function module number from a combination of the function key code and the first data series; and (4) starting the function module corresponding to the extracted function module number.

22. The process of claim 21, wherein the function module number is extracted through use of a decoding algorithm.

23. The system of claim 21, wherein the function module number is extracted through use of a decoding algorithm.

24. The process of claim 9, wherein the second data series is changed and stored in the image forming apparatus during an assembling process.

25. The process of claim 9, wherein the second data series is changed and stored in the image forming apparatus which is completely assembled.

26. A system for implementing a plurality of function modules stored in an image forming apparatus, said system comprising:

first means for selectively operating one of a control panel and a management program of the image forming apparatus;

second means for providing an input of a function key code, said code being generated by combining a first data series for identifying respective image forming apparatuses with a second data series corresponding to function module numbers;

third means for storing the function key code in a memory; and fourth means for starting the function module by restarting the image forming apparatus after carrying out the preceding functions.

27. The system of claim 26, wherein the function key code is generated by a coding algorithm for coding a combination of the first data series and the second data series.

28. The system of claim 26, wherein the fourth means for starting the function module comprises:

means for recognizing the function key code;

means for recognizing the first data series;

means for extracting the function module number from a combination of the function key code and the first data series; and means for starting the function module corresponding to the extracted function module number.

29. The system of claim 26, wherein the first data series is a serial number of the image forming apparatus.

30. The system of claim 26, wherein the first data series is a brand name of the image forming apparatus.

31. The system of claim 26, wherein the first data series is a model name of the image forming apparatus.

32. The system of claim 26, wherein, when the second data series comprises a plurality of data, each of which has a different value.

33. The system of claim 26, wherein the second data series is newly inputted and stored in the image forming apparatus during an assembling process.

34. The system of claim 17, wherein the second data series is newly inputted and stored in the image forming apparatus which is completely assembled.

35. The system of claim 17, wherein the second data series is changed and stored in the image forming apparatus during an assembling process.

36. The system of claim 17, wherein the second data series is changed and stored in the image forming apparatus which is completely assembled.

* * * * *